H. NEU AND L. BLAHA.
PROTECTIVE DEVICE FOR AUTOMOBILES.
APPLICATION FILED APR. 19, 1918.
1,403,343.
Patented Jan. 10, 1922.
2 SHEETS—SHEET 1.
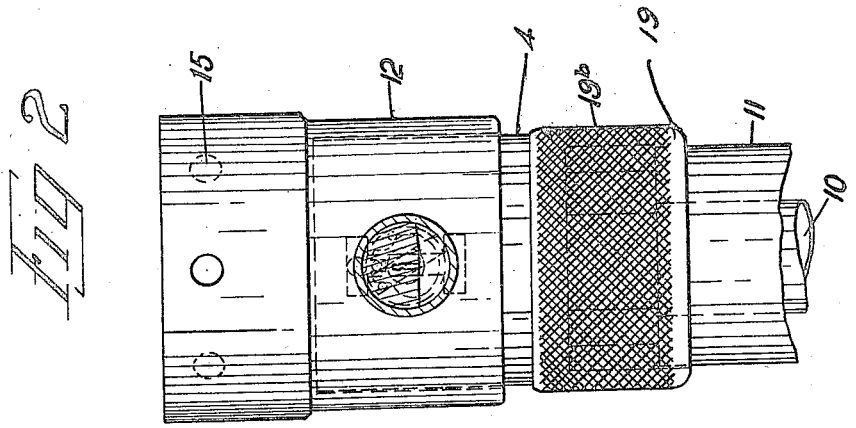
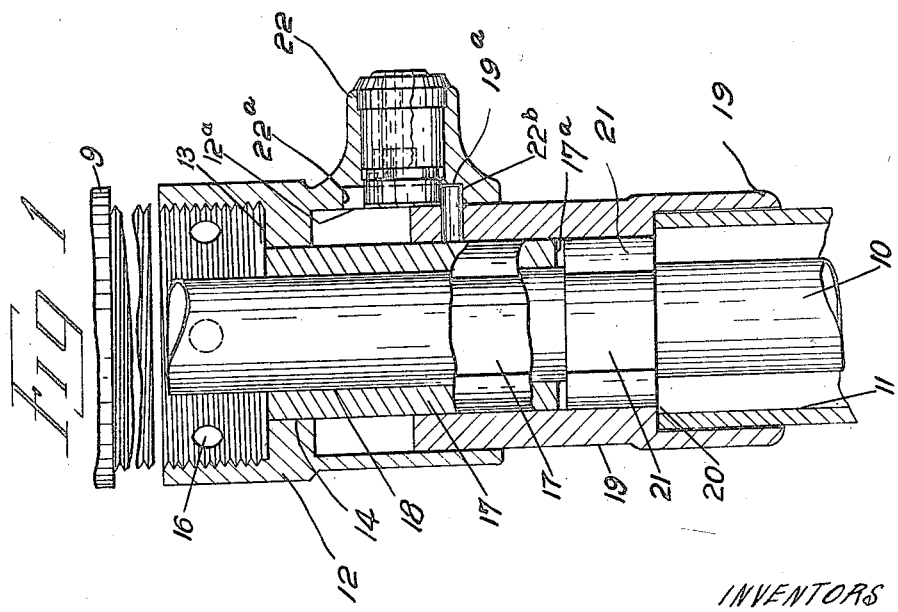
INVENTORS
Hugo Neu and Ludwig Blaha
Clifford E. Dunn ATTORNEY

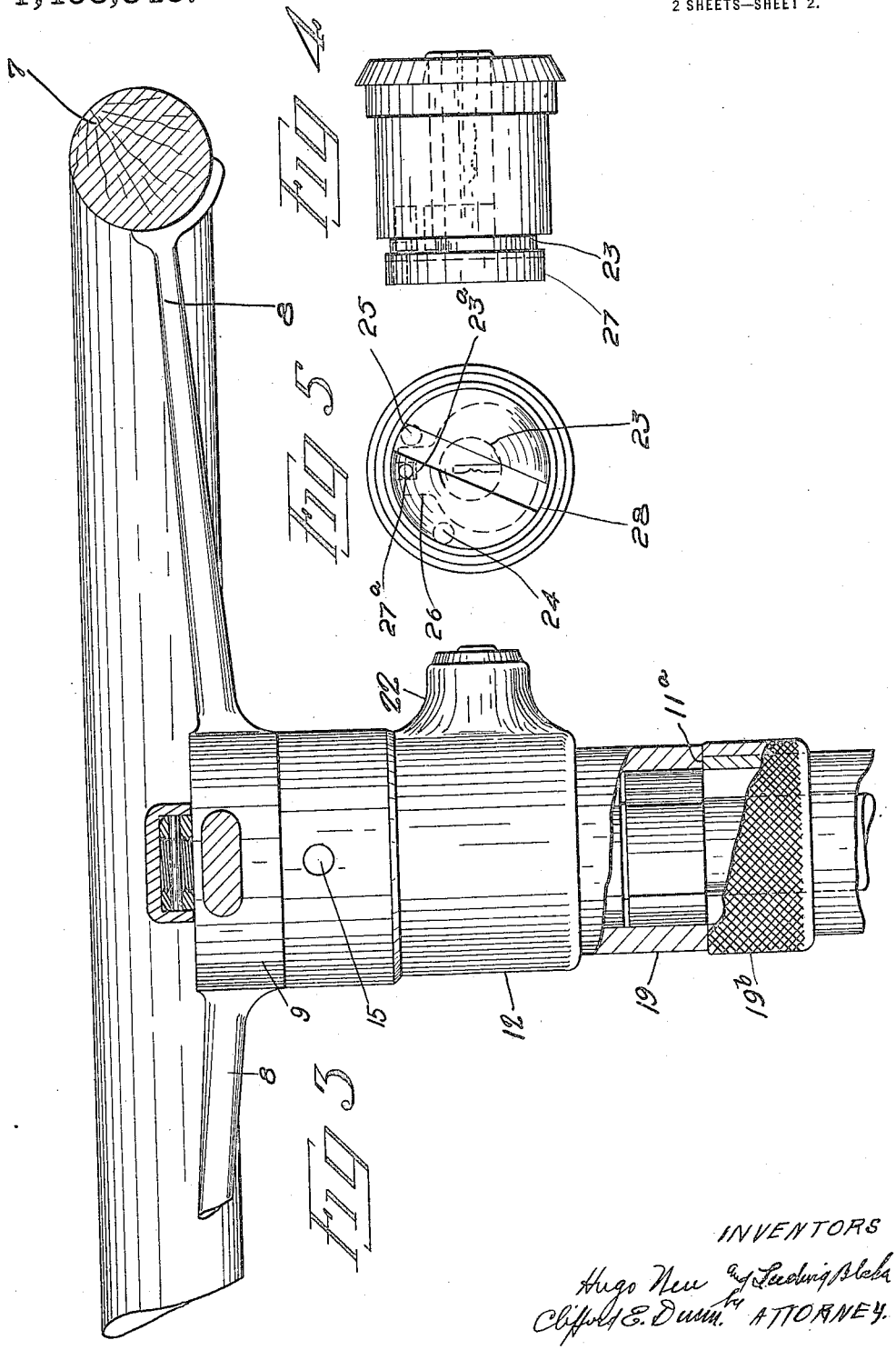

UNITED STATES PATENT OFFICE.

HUGO NEU, OF NEW YORK, N. Y., AND LUDWIG BLAHA, OF LYNDHURST, NEW JERSEY.

PROTECTIVE DEVICE FOR AUTOMOBILES.

1,403,343.　　　　　Specification of Letters Patent.　　Patented Jan. 10, 1922.

Application filed April 19, 1918. Serial No. 229,586.

*To all whom it may concern:*

Be it known that we, HUGO NEU, a citizen of the United States, residing in the city, county, and State of New York, and LUDWIG BLAHA, a subject of the Emperor of Austria, residing at Lyndhurst, county of Hudson and State of New Jersey, have invented certain new and useful Improvements in Protective Devices for Automobiles, of which the following is a specification.

The present invention relates generally to motor vehicle construction, and is more especially directed to protective devices for those vehicles such as illustrated and described in our reissued Letters Patent No. 14,451, dated March 26, 1918.

The primary object of the present invention is to simplify and improve upon the construction disclosed in our aforesaid patent and to provide a device which may, therefore, be more economically and expeditiously manufactured, assembled and attached to the co-operating parts of motor vehicles and which will at the same time possess greater durability by reason of the lesser number of parts employed and the manner of effecting their co-operation, under different requirements of use.

A further object of our present invention, in addition to the foregoing, is to provide an improved or special form of locking means for maintaining the parts of the protective device in their proper co-operative relation under certain predetermined conditions, as will be understood by reference to our aforesaid patent and the following description, whereby the scope of protection afforded to the vehicle, to which our invention is applied, is enhanced.

Other objects of the present invention from the standpoint of manufacture, application and use, will be evident as the description proceeds, and we would have it distinctly understood that we reserve unto ourselves all rights to the full range of equivalents, both in use and in structure, to which we may be entitled in the application or employment of our invention in its broadest aspect.

We shall now proceed to describe our invention with reference to the accompanying drawings, which illustrate one embodiment thereof, and will then point out with more particularity the essential elements of novelty in the appended claims.

In the drawings:—

Fig. 1 is a sectional view of our improved form of protective device for motor vehicles applied to the steering wheel of a vehicle, showing the relative positions of the parts when the wheel is connected to the steering column.

Fig. 2 is an elevation showing the component parts of our device when the wheel is disconnected from the post.

Fig. 3 is an elevation partly in section showing the relative position of the parts of our device when the steering wheel is connected to the steering post.

Fig. 4 is an enlarged detail view of the form of lock employed by us in connection with our protective device; and Fig. 5 is a plan view taken from the left hand side of Fig. 4.

Referring now to the drawings in detail, in which like characters of reference designate similar parts throughout the several views, 7 represents a steering wheel having the usual spokes 8 and hub member 9 from which the spokes radiate. The hub member, as is well known, is exteriorly fastened to the steering post 10, which is surrounded and protected by column 11. In the application of the present invention to a motor vehicle, we detach the steering wheel from the steering post, shorten the column 11 as shown at 11ᵃ in Fig. 3, and then thread the exterior of the hub 9, as shown in Fig. 1, these threads being adapted to mesh with threads of a similar pitch on the interior of the tubular or cylindrical member 12, the lower edge of the hub abutting against the inwardly directed integral flange 13 of the member 12 which is hexagonally apertured as shown at 14. When the hub is seated in the tubular member 12, as just described, it is non-releasably secured thereto by means of pins 15 passing through the openings 16 in the said member 12 and registering openings provided in the hub 9. To prevent removal of the pins, the holes or apertures 15 are then sealed or closed by filling them with a suitable metal and submitting the whole to grinding or such other treatment as nickel-plating, or the like, as may be desired.

Positioned within the cylindrical member 12 is a hexagonal sleeve or member 17 having an annular bore 18, which forms a bearing free to rotate upon the steering post 10. This hexagonal member or sleeve 17 is formed integral with or welded to the inwardly directed flange 13 on the said tubular member 12 and extends below the plane of the lower edge of the said member, as indicated at 17ª in Fig. 1. Telescopically mounted within the tubular or cylindrical member 12 is a sleeve 19, the interior of which is hexagonal in configuration to register with and ride upon the exterior of the hexagonal member 17. The hexagonal configuration of the said sleeve 19, however, terminates a considerable distance inwardly of the lower end thereof, as shown at 20 in Fig. 1, forming an enlarged annular chamber within which the upper end of the column 11 lies, the diameter of this chamber being sufficient to permit the free rotation of the said sleeve about the hexagonal member 21, which is keyed, or otherwise rigidly fastened, to the steering post 10. This latter hexagonal member is adapted to register with, and is of the same dimensions as, the hexagonal sleeve or member 17. It is, therefore, obvious that, while the sleeve 19 may rotate freely about the hexagonal member 21 when the said sleeve is in the position shown in Fig. 2, it will serve as a coupling medium between the hexagonal members 17 and 21 when drawn downwardly to the position shown in Figs. 1 and 3 by reason of its interior surface, which is complemental to the exteriors of the said hexagonal members 17 and 21.

It is obvious that the sleeve 19 must have means for supporting it in either of the two positions illustrated, and that to render our invention effective, this means must be of a character which will at once be positive in operation and absolutely prevent manipulation of the sleeve by an unauthorized person. To accomplish this we provide a lock housing 22, which is preferably formed integral with the cylindrical or tubular member 12 and projects outwardly therefrom, as clearly shown in Fig. 1. This housing is of the requisite size to receive a barrel lock of the pin, or a similar type, which embodies a key-actuated plate 23, (shown in dotted lines in Fig. 5,) the movement of this plate, under the manipulation of the key, being limited by the stops or pins 24 and 25, respectively, which are engaged by the reduced portion of said plate indicated at 26. (See Fig. 5.) The rear portion of the lock housing 22 is enlarged, as indicated at 22ª, that part of the wall of the tubular member 12 adjacent thereto being formed with an elongated vertically disposed opening 12ª. Positioned between the partition formed by the aforesaid portion of the wall of the tubular member 12 and the key-actuated plate 23 is a disc or annular member 27, the inner face of which is provided with a diametrically disposed slot or depression 28 of approximately the same dimensions as the elongated opening 12ª in the wall of said tubular member 12. The disc or annular member 27 is adapted to be rotated in its bearing formed by the enlarged portion of the lock housing 22, as aforesaid, by the movement of the key-actuated plate 23, this being accomplished by the pin 27ª carried by the said disc or annular member 27 projecting into and moving within the slot 23ª of the said plate.

Adjacent to its upper end the telescoping sleeve 19 is provided with a rectangular pin or projection 19ª, which is of a size to permit it to move through the opening 12ª in the wall of the member 12, the end thereof extending into and riding through the depression or elongated slot 28 when the slot and the opening 12ª in the wall of said member 12 are in alignment. This operation is effected by manipulating the key to the necessary position, which permits the movement of the telescoping sleeve 19 to the position shown in Fig. 1, or to that shown in Fig. 2, by grasping the lower extremity of the said sleeve 19, which is knurled or roughened at 19ᵇ to afford a firm grip.

From the foregoing description it will be manifest that the telescoping sleeve 19 may be locked in either raised or lowered position by the simple expedient of moving the sleeve to its limit of travel in either direction, and, while it is held in such position, throwing the slot or depression 28 out of alignment with the opening 12ª in the wall of the tubular member 12 by the actuation of the key plate 23 by the key (not shown), the pin 19ª in either instance being held between the unbroken portion of the periphery of the disc or annular member 27 and the adjacent walls of the enlarged portion 22ª of the lock housing.

When the parts are in the position shown in Fig. 2, it is evident that the telescoping sleeve 19 will be held in its raised position by the engagement of the disc 27 with the pin 19ª, so that the interior complemental surface of the said sleeve 19 will be out of register or engagement with the exterior of the hexagonal member 21 fast to the steering post 10. Therefore, the steering wheel 7 will be rendered ineffective relative to the steering post, and it will be obviously impossible for an unauthorized person to guide the motor vehicle. To couple or lock the steering wheel to the steering post 10, so that the vehicle may be driven, all that is required is to manipulate the key so as to bring the elongated slot 28 again into alignment or registration with the opening 12ª in the wall of the cylindrical member 12, whereby the telescoping sleeve 19 may be moved downwardly until the pin 19ª rests upon the abutment 22ᵇ. The movement of the sleeve 19 to this position effects the engagement of the complemental interior and exterior surfaces of the members 19 and 17 and 21, the member 19 being then maintained in cou- -pling or locking position by throwing the slot 28 in the disk or annular member 27 out of alignment with the opening 12ª in the tubular member 12, as hereinbefore described.

Having thus described our invention what we claim as new and desire to secure by Letters Patent of the United States is:

1. In a protective device for motor vehicles, the combination of a steering wheel and a steering post, of a tubular member having an interiorly threaded recessed portion at the top thereof adapted to receive the threaded hub of a steering wheel, means for rigidly securing the steering wheel in position within said recess, a member non-rotatably mounted on said steering post, a coupling member telescopically mounted in said tubular member and adapted to engage said non-rotatable member to connect said steering wheel to said steering post, said coupling member being capable of movement to disconnect said steering wheel from said steering post, and means for locking said coupling member in effective or ineffective position, said means being wholly contained within said tubular member.

2. In a protective device for motor vehicles, the combination of a steering wheel and a steering post, of a tubular member having an interiorly threaded recessed portion at the top thereof adapted to receive the hub of the steering wheel, means for rigidly securing the steering wheel in position within said recess, a member non-rotatably mounted on said steering post, a coupling member telescopically mounted in said tubular member and adapted to engage said non-rotatable member to connect said steering wheel to said steering post, said coupling member being capable of movement to disconnect said steering wheel from said steering post, and means for locking said coupling member in effective or ineffective position, said means being wholly contained within said tubular member, and embodying a projection carried by said coupling member and a key-actuated locking disc located in said tubular member adapted to engage said projection to hold said tubular member against movement.

3. In a protective device for motor vehicles having a lock carrying member and a relatively movable coupling element formed with a projection, the combination of means for locking said coupling element in either of two predetermined positions, said means including a lock mechanism, a plate capable of actuation thereby, a disc connected to said plate and provided with a medially disposed slot to form a passageway for said projection through said disc, to permit of the free movement of said coupling element to one or the other of its positions, and means for functioning said disc to engage said projection and render said coupling element immovable.

4. In a protective device for motor vehicles having a lock carrying member and a relatively movable coupling element formed with a projection, the combination of means for locking said coupling element in either of two predetermined positions, said means including a lock mechanism, a plate capable of actuation thereby, stops for limiting the movement of said plate, and a disc connected to said plate and provided with a medially disposed slot, the functioning of said lock mechanism serving to move the slot in said disc into or out of alinement with the projection on said coupling element.

5. In a protective device for motor vehicles having a lock carrying member and a relatively movable coupling element, the combination of a lock mechanism mounted in said lock carrying member, a projection on said coupling element, a plate connected to and capable of actuation by said lock mechanism, means for limiting the movement of said plate, a disc connected to said plate and formed with a medially disposed slot, adapted to form a passageway for the projection on said coupling element, whereby the latter may be moved to one or the other of its predetermined positions, whereby the actuation of the lock mechanism will bring the periphery of said disc into engagement with said projection to render said coupling element immovable.

6. A means for locking the relatively movable parts of a protective device for motor vehicles, comprising a lock mechanism, a plate capable of actuation thereby, stops for limiting the movement of said plate, a disc connected to said plate and formed with a diametrically disposed slot, and means on one of the members of said protective device adapted to cooperate with said disk, whereby said member may be rendered immovable.

HUGO NEU.
LUDWIG BLAHA.